United States Patent
Farkas et al.

[19]

[11] Patent Number: 5,911,199
[45] Date of Patent: Jun. 15, 1999

[54] PRESSURE SENSITIVE ANIMAL TRAINING DEVICE

[75] Inventors: Gregory J. Farkas, Alpine; Chad R. James; Eric H. Stapp, both of Tucson, all of Ariz.

[73] Assignee: Eltrex 4, Inc., Tucson, Ariz.

[21] Appl. No.: 09/013,415

[22] Filed: Jan. 26, 1998

[51] Int. Cl.⁶ .......................... A01K 27/00; A01K 15/00
[52] U.S. Cl. .......................... 119/859; 119/822; 119/908; 119/712; 119/792
[58] Field of Search .................. 119/859, 862, 119/908, 765, 770, 712, 792, 822; 340/573

[56] References Cited

U.S. PATENT DOCUMENTS

| | | |
|---|---|---|
| 2,023,950 | 12/1935 | Carter . |
| 2,394,144 | 2/1946 | Brose ..................................... 119/862 |
| 2,628,592 | 2/1953 | Johnston . |
| 3,319,605 | 5/1967 | Early et al. .......................... 119/859 X |
| 3,687,112 | 8/1972 | Henderson ........................... 119/859 X |
| 3,874,339 | 4/1975 | Coulbourn . |
| 4,180,013 | 12/1979 | Smith .................................. 119/908 X |
| 4,202,293 | 5/1980 | Gonda . |
| 4,640,295 | 2/1987 | Isaacson .................................. 128/748 |
| 4,794,402 | 12/1988 | Gonda . |
| 4,802,482 | 2/1989 | Gonda . |
| 4,885,571 | 12/1989 | Pauley et al. ........................... 340/573 |
| 4,919,082 | 4/1990 | Tsai ..................................... 119/859 X |
| 4,945,860 | 8/1990 | Walker . |
| 4,947,795 | 8/1990 | Farkas . |
| 5,054,428 | 10/1991 | Farkas . |
| 5,099,797 | 3/1992 | Gonda . |
| 5,193,484 | 3/1993 | Gonda . |
| 5,494,002 | 2/1996 | Green . |
| 5,601,054 | 2/1997 | So . |
| 5,722,352 | 3/1998 | Leatherman ........................... 119/822 |

*Primary Examiner*—Michael J. Carone
*Assistant Examiner*—James S. Bergin
*Attorney, Agent, or Firm*—LaValle D. Ptak

[57] ABSTRACT

An animal training device comprises a housing which is designed to be attached to an animal collar at a point on the collar diametrically opposite the point where a leash may be attached. The housing has a rear face, adjacent the neck of an animal when it is worn on the collar of such animal, and a front face. At least one pair of electrodes extends from the rear face of the housing; and a pressure sensitive transducer is located on the front face of the housing for engagement by the collar. An electronic circuit is located in the housing; and it is coupled between the pressure sensitive transducer and the electrodes to provide electrical stimulus pulses of varying intensity across the electrodes in response to changes on the pressure sensitive transducer, once the pressure crosses a pre-established threshold.

17 Claims, 2 Drawing Sheets

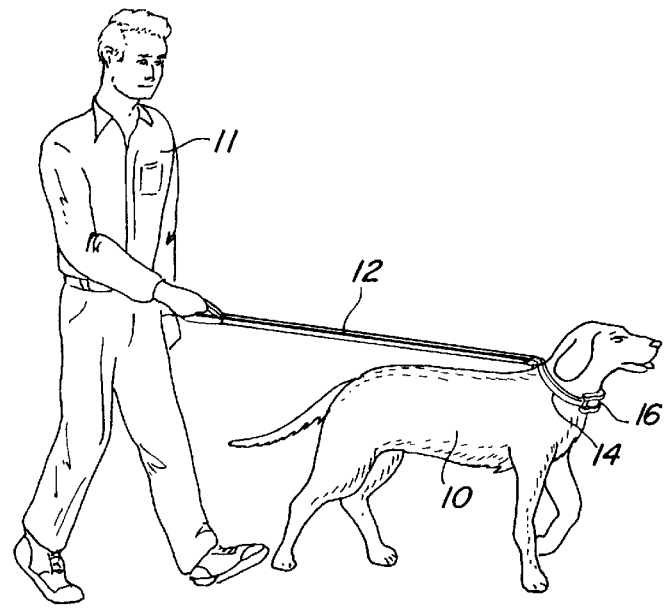
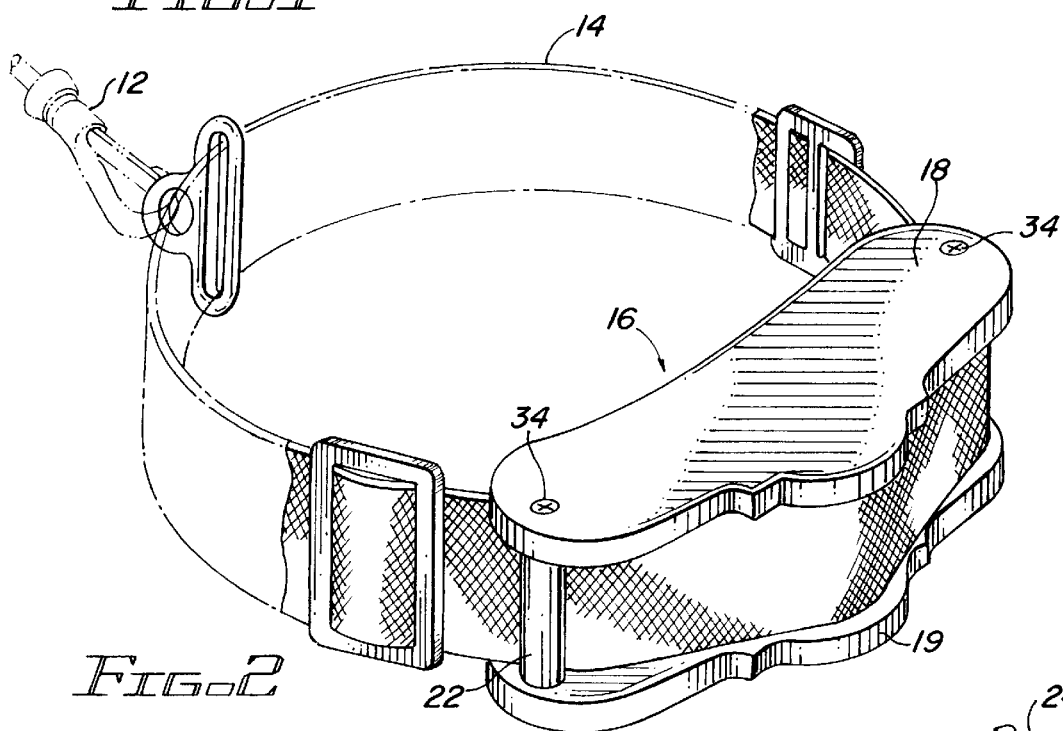
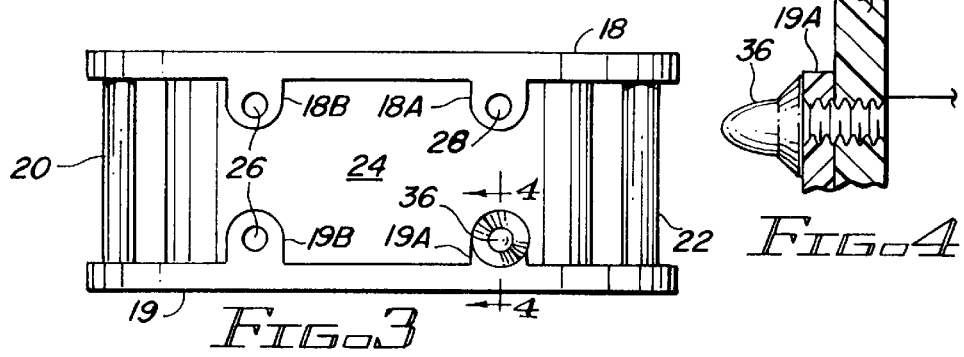

PRESSURE SENSITIVE ANIMAL TRAINING DEVICE

BACKGROUND

In the training of animals, particularly dogs, trainers employ various techniques for encouraging or discouraging various responses or behaviors of the animal. Typically, encouragement is effected by means of a small tidbit of food as a reward for desired behavior or responses. For undesired behavior or responses, a loud disapproving voice or a mild physical reprimand often is employed.

Various devices have been designed for applying a stimulus for undesirable behavior in the form of an electrical stimulus to the neck of the dog undergoing training. Many of these devices include radio signal receiver packs for responding to transmitted signals to administer the electrical stimulation, as desired, under control of the trainer operating the transmitter.

Five patents directed to specific features of remote radio controlled devices are the U.S. patents to Gonda U.S. Pat. No. 4,794,402; Gonda U.S. Pat. No. 4,802,482; Gonda U.S. Pat. No. 5,099,797; Farkas U.S. Pat. No. 5,054,428; and Gonda U.S. Pat. No. 5,193,484. In all of these devices, the dog collar is provided with an attached receiver/stimulus unit, which has a pair of electrodes projecting from it to contact the skin of the dog on the inner side of the collar. Whenever a behavior pattern requiring correction or cessation is exhibited by the dog, a signal is sent by the transmitter, under control of the trainer, to the receiver unit being worn on the collar of the dog. This signal operates circuitry within the receiving unit to cause the application of a mild electrical stimulus across the electrodes. This serves to provide the trainer with control over the actions of the dog over a relatively wide distance.

Other patents employing circuits similar to those disclosed in the above mentioned patents are designed to respond to the sound of a barking dog to operate circuitry for applying electrical stimulus to probes extending through a collar or attached to a dog collar. Three such U.S. patents are the patents to Gonda U.S. Pat. No. 4,202,293; Farkas U.S. Pat. No. 4,947,795 and So U.S. Pat. No. 5,601,054. Although the circuits described in these patents differ from one another, all of them are operated by sensors for detecting either the sound of or vibration of the barking dog to operate a switch, which in turn causes the circuitry within the devices to apply a short high voltage stimulus across a pair of electrodes in contact with the neck of the dog. The device of the Farkas patent operates to produce an initial, relatively low stimulus electrical pulse stimulation in response to the onset of barking. If the dog continues to bark, or barks again within a pre-established time frame, an increased level of electrical stimulation pulses is applied; and this takes place for each barking episode in a step-by-step fashion until the dog stops barking for a predetermined period of time, after which the device resets to its initial condition of operation.

Other devices for use in animal control are disclosed in the United States patent to Johnston U.S. Pat. No. 2,628,592 for an electrical calf weaner and the U.S. patent to Walker U.S. Pat. No. 4,945,860. The device of the Johnston patent is attached to the nose of a calf and is designed to be operated by a pressure activated switch when the calf attempts to press against the udder of a cow. Closure of the switch causes a mild electrical shock to be applied to the nose of the calf to facilitate the weaning process.

The Walker patent discloses a device similar to that of the Johnston patent; except that the pressure switch is placed on the forehead of the animal; so that if the animal pushes against an object, the switch is closed. Closure of the switch activates an electrical stimulation generating circuit to apply a mild stimulus to the head of the animal to deter it from the pushing behavior.

Situations exist when remote control devices, such as the dog training devices described above and the self-contained pressure-activated devices of the Johnston and Walker patents are not desired or required. One type of a situation where the devices described above are inconvenient to use or are not practical is in the training of an animal, such as a dog, to respond properly to a leash attached to its collar. As is well known, an untrained dog tends to pull hard against the leash which is being held by a trainer or its owner, resulting in unnecessary strain on behalf of both the person holding the leash and the dog. For proper behavior on a leash, a dog typically is taught to walk alongside of or slightly behind the owner, with a relatively slack leash, exerting no pull or very little pull by the dog against the leash.

Patents which are directed to electrical devices to assist in training a dog not to pull against a leash include the U.S. patent to Carter U.S. Pat. No. 2,023,930. The device of the Carter patent is designed with spaced apart electrodes which are attached to the dog collar. The electrodes are connected by wires extending along the length of a leash to a battery pack and switch, which is held by the trainer. When the trainer determines that the dog is exerting a pull on the leash or some other behavior which is not desired, the on/off switch in the battery pack is operated to send a signal to the electrodes on the collar. The signal is selected to give the dog a stimulus sufficient to cause the dog to obey a word or command or to take some desired action upon hearing a particular warning sound.

The patent to Green U.S. Pat. No. 5,494,002 is directed to an animal training device coupled to a leash. A trigger extends from the body of the device to contact the leash; and when a force is exerted by the leash which is in excess of a pre-established threshold, the tensioning of the leash activates a sound generator. The sound is one which is selected to startle the animal; so that it eventually learns to avoid the sound and to walk safely at the owner's side.

A different leash activated device is disclosed in the patent to Coulbourn U.S. Pat. No. 3,874,339. The device of this patent includes a stimulation circuit carried in a housing on the back side of the collar to which the leash is attached. Wires then extend from the shock circuit to a pair of electrodes located on the underside or lower neck side of the collar. When the dog exerts a pull in excess of a threshold amount, a switch is closed to apply a current across the electrodes and thereby to the neck of the dog or other animal. The amount of stimulus which is applied by the device is the same in all cases, irrespective of the force of the pull, so long as the minimum threshold is exceeded.

It is desirable to provide an improved animal training device, specifically a pressure-responsive training device which is simple and direct in operation, and which applies different levels of electrical stimulus to the animal which are directly proportional to the degree of departure from a desired behavior.

SUMMARY OF THE INVENTION

It is an object of this invention to provide an improved animal training device.

It is another object of this invention to provide an improved electrical or electronic animal training device.

It is an additional object of this invention to provide an improved animal training device applying stimuli to an animal in proportion to the degree of misbehavior which is to be corrected.

It is a further object of this invention to provide an animal training device of the type which applies electrical stimulus between a pair of electrodes in contact with the skin of the animal, where the amount of stimulus is varied in proportion to a pull exerted by the animal on a leash attached to the collar of the animal.

In accordance with a preferred embodiment of the invention, an animal training device includes a housing which may be attached to an animal collar or harness. A rear face of the housing is in contact with the neck of the animal; and it has a pair of electrodes extending from it to contact the skin of the animal. A pressure sensitive transducer is located on the housing; and this transducer is engaged by the animal collar or harness. When the collar or harness is attached to a leash and when the collar or harness is worn by the animal, pull on the leash, and thereby the collar or harness, causes different pressures to be applied to the pressure sensitive transducer. An electronic circuit in the housing is coupled between the electrodes and the pressure sensitive transducer to provide varying electric stimulus signals to the electrodes in response to changes in pressure on the pressure sensitive transducer. Thus, the stimulus applied to the animal through the electrodes is varied in proportion to the pressure exerted on the pressure sensitive transducer.

BRIEF DESCRIPTION OF THE DRAWINGS

FIG. 1 is an illustration of the environment of operation of a preferred embodiment of the invention;

FIG. 2 is a perspective view of a preferred embodiment of the invention in its operative configuration;

FIG. 3 is a rear view of the device shown in FIG. 2;

FIG. 4 is a detail taken along the line 4—4 of FIG. 3;

DETAILED DESCRIPTION

Figure 5:
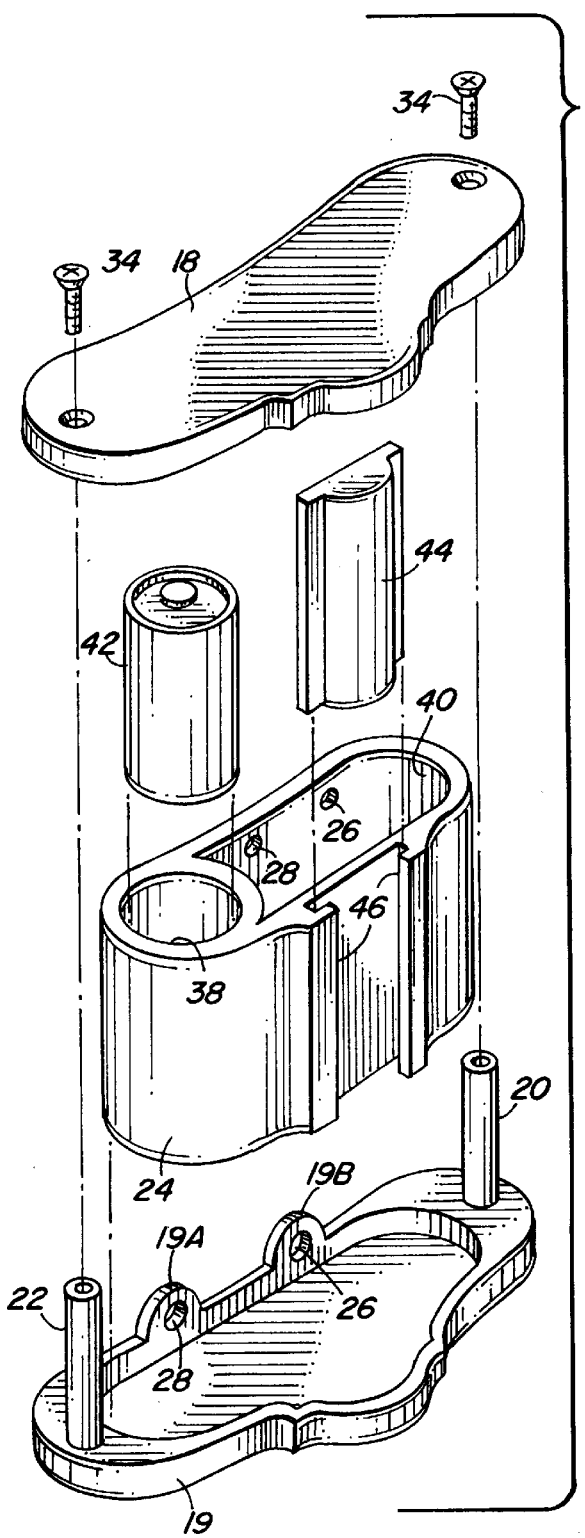
FIG. 5 is an exploded view of a preferred embodiment of the invention.

As used herein, the word "collar" also means a halter, harness or other device worn by or attached to an animal.

Reference now should be made to the drawings, in which the same reference numbers are used throughout the different figures to designate the same or similar components. FIG. 1 illustrates an animal 10, shown as a dog, being walked by a trainer or owner 11, who is holding a leash 12 attached to a collar 14 around the neck of the dog. On the front side or the throat side of the collar, an animal training device 16 is attached.

FIG. 2 is an enlarged view of the leash 12 and collar 14, along with the animal training device 16. As shown in the remainder of the figures, the device 16 includes an upper plate 18 and a lower plate 19 enclosing a central body 24 to form a housing for the animal training device of a preferred embodiment of the invention. The central body 24 is spaced at its left-hand and right-hand edges (as viewed in FIGS. 2, 3 and 5) from a pair of support posts 20 and 22, which are used to pull the top and bottom plates 18 and 19 together snugly against the top and bottom of the body portion 24 by means of a pair of screws 34, shown in FIGS. 2 and 5. The space between the posts 20 and 22 and the body portion 24 is used to guide and hold the collar 14 in place, as shown most clearly in FIG. 2.

On the rear side of the central body 24, or the side which faces and is held against the neck of the dog 10, four electrode openings in two pairs 26 and 28 are provided. The openings of each pair 26 and 28 are spaced apart and extend through flanges 18A and 18B on the upper plate 18 and through flanges 19A and 19B on the bottom plate 19, as shown most clearly in FIGS. 3 and 5. These openings or holes in the flanges also cooperate with corresponding holes through the main body 24 to accommodate electrodes. The electrodes 36 may be of any suitable configuration for extending outwardly from the body of the device and through the hair of the dog or other animal to contact the skin on the throat side of the animal when the device is in the position shown in FIG. 1.

FIG. 4 is a cross-sectional view illustrating the manner in which an electrode 36 is inserted into and held in place in the opening 28 through the projection 19A and the body 24. A corresponding or companion electrode of an electrode pair then is provided in the position 18A, as shown in FIG. 3. If an additional pair of electrodes 36 is desired, such additional electrodes 36' may be inserted through the openings 26 in the flanges 18B and 19B to provide an additional set of electrodes operated in parallel with the operation of the electrodes 36 or in an alternating pattern. The device disclosed, however, works with a single pair of electrodes in its basic form; and additional electrode pairs, such as the pair 36', may be employed, as desired, for some applications.

On the front side (the side facing away from the neck of the animal 10) of the central body 24, a pair of flanges 46 are provided (see FIG. 5) into which a conventional pressure-sensitive transducer 44 is inserted. As is readily apparent from an examination of FIGS. 2 and 5, the transducer 44 extends outwardly from the exterior of the central body 24 of the housing, and is firmly engaged by the rear side of the collar 14 when the collar is in place as shown in FIG. 2. Various types of commercially available pressure sensitive transducers may be used for the transducer 44. The characteristic which is desired for such transducers is that they exhibit a change in resistance (preferably a decrease) in response to increased pressure. Consequently, when the transducer 44 is connected across a source of operating potential, current output from the transducer is produced much in the manner of the moving contact of a potentiometer, with low pressure or no pressure on the transducer causing it to exhibit its highest resistance to current flow therethrough. Increasing pressure applied to the front face of the transducer 44 causes it to exhibit corresponding proportional decreases in resistance until a lowest or least resistant level is attained for some maximum pressure applied to the transducer 44. Transducers and circuits operating in this manner are well known. Consequently, no details of the actual circuit operation is considered necessary.

The assembly which is used in the animal training device includes a self-contained power supply in the form of a battery 42, illustrated in FIG. 5. The battery 42 is connected (through circuitry not shown) to standard electrical stimulus producing circuitry located within the hollow portion 40 of the central body 24. This circuitry includes a connection to the transducer 44 to provide a signal from the transducer 44 to the stimulus control circuitry 54, which controls the intensity of signals produced by an electrical stimulus generator 56, connected to the electrodes 36, as illustrated diagrammatically in FIG. 6.

Figure 6:
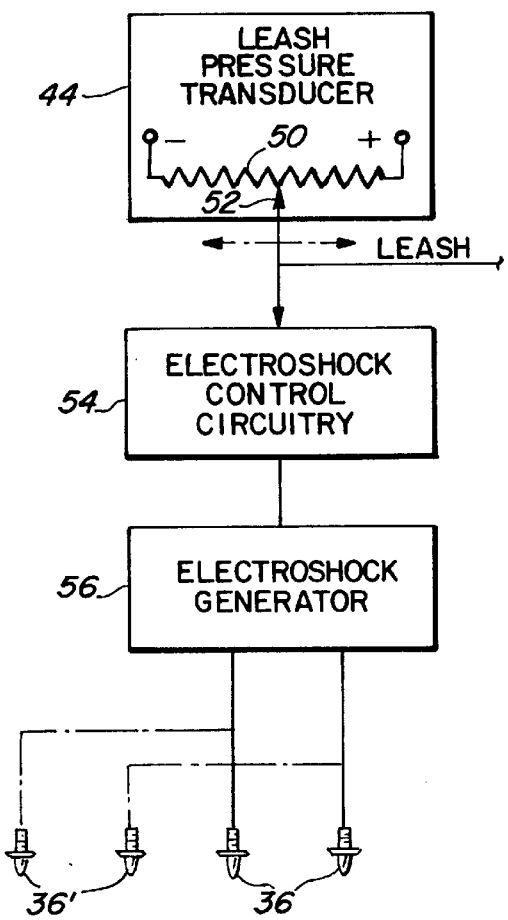
FIG. 6 is a circuit diagram of a circuit used in conjunction with the embodiment of the invention shown in FIGS. 2, 3, 4 and 5.

The actual circuitry shown in FIG. 6 may be standard circuitry of the type employed in various ones of the patents described previously in the background portion of this invention. It is important to note, however, that the circuitry responds to the current provided through the varying resistance of the potentiometer 50 of the pressure sensitive transducer 44. This is illustrated in FIG. 6 diagrammatically by the location of a pointer 52 of a potentiometer 50, which responds to the pressure exerted on the leash 12 by the pull of the dog 10 against the leash held in the hand of the owner or trainer 11. It should be noted that while a potentiometer is used to illustrate the pressure sensitive transducer, any suitable device capable of providing varying resistance in response to the application of varying pressure may be used in the circuit. The circuitry 54 and the generator 56 then responds to this varying current to apply electrical stimulus pulses at a lowest level across the pair of electrodes 36 (and/or additional pair of electrodes 36', illustrated in dotted lines in FIG. 6) once a pre-established lower threshold of pressure is applied to the pressure sensitive transducer 44. As increased pressure is applied, causing a drop in the resistance in the transducer 44 (illustrated as the potentiometer 50 in FIG. 6), the control circuitry 54 and generator 56 produce pulses of increased intensity, such as amplitude, frequency, pulse width, and/or duration across the electrodes 36. The magnitude of the stimulus pulses increases up to some maximum value in response to corresponding changes (selected to either increases or decreases) in the pressure or pull on the leash 12 exerted against the pressure sensitive transducer 44 through the collar 14.

The control circuitry may apply single pulses of the magnitude corresponding to the pressure on the pressure sensitive transducer; or the circuitry may be employed to apply multiple bursts of pulses of varying intensity (and/or duration) in accordance with the amount of pressure exerted on the transducer 44.

In the system which is disclosed, whenever the dog lunges ahead or applies pressure pulling on the leash, the strap or collar 14 pulling against the pressure transducer 44 causes a corresponding reduction in the resistance of the resistor (illustrated as a potentiometer 50. The corresponding current through the transducer then causes the stimulation control circuitry to apply relatively high electrical stimulation across the electrodes as pressure is applied to the transducer 44. If the dog applies only a small amount of pressure, a relatively low level electrical stimulus is applied across the electrodes 36. On the contrary, if the dog applies a great deal of pressure, such as caused by a sudden lunge, a relatively high level of electrical stimulation is applied across the electrodes 36. As stated previously, this stimulation can either be a momentary signal or a continuous signal, depending upon other configurations of the control circuitry 54 and generator 56. These different configurations are well known and may be applied in conjunction with the device illustrated in the drawings. The type of circuitry used, for example, may be of the general type described in conjunction with the Farkas U.S. Pat. No. 4,947,795.

The foregoing description of the preferred embodiment of the invention is to be considered as illustrative and not as limiting. Various changes and modifications will occur to those skilled in the art for performing substantially the same function, in substantially the same way, to achieve substantially the same result, without departing from the true scope of the invention as defined in the appended claims.

What is claimed is:

1. An animal training device including in combination:

a housing adapted for attachment to an animal collar, said housing having a rear face and a front face;

at least one pair of electrodes extending from the rear face of said housing;

a pressure sensitive transducer on the front face of said housing for engagement by said animal collar; and an electronic circuit in said housing coupled to said electrodes and to said pressure sensitive transducer to provide electric stimulation pulses to said electrodes, the intensity of said stimulation pulses being proportional to the pressure on said pressure sensitive transducer.

2. The combination according to claim 1 wherein said housing further has guide members thereon for facilitating the passage of said collar around said guide members and over said pressure sensitive transducer, with said rear face of said housing designed to fit against the neck of an animal being trained.

3. The combination according to claim 2 wherein said electronic circuit includes a self-contained power supply for providing said electric stimulation pulses to said electrodes in accordance with pressure exerted on said pressure sensitive transducer by said collar in excess of a predetermined amount.

4. The combination according to claim 3 wherein said power supply comprises a battery.

5. The combination according to claim 4 wherein said housing is adapted for attachment to an animal collar at a position diametrically opposite to an attachment of a leash to such collar.

6. The combination according to claim 4 further including a second pair of electrodes extending from the rear face of said housing and coupled to said electronic circuit in said housing to receive electric stimulation pulses therefrom.

7. The combination according to claim 1 further including a second pair of electrodes extending from the rear face of said housing and coupled to said electronic circuit in said housing to receive electric stimulation pulses therefrom.

8. The combination according to claim 1 wherein said housing is adapted for attachment to an animal collar at a position diametrically opposite to an attachment of a leash to such collar.

9. The combination according to claim 8 wherein said housing further has guide members thereon for facilitating the passage of said collar around said guide members and over said pressure sensitive transducer, with said rear face of said housing designed to fit against the neck of an animal being trained.

10. The combination according to claim 9 wherein said electronic circuit includes a self-contained power supply for providing said electric stimulation pulses to said electrodes in accordance with pressure exerted on said pressure sensitive transducer by said collar in excess of a predetermined amount.

11. The combination according to claim 10 wherein said power supply comprises a battery.

12. An animal training device including in combination:

a housing adapted for attachment to an animal collar, said housing having a rear face;

at least one pair of electrodes extending from the rear face of said housing;

a pressure sensitive transducer on said housing for responding to a pulling pressure on said animal collar; and an electronic circuit in said housing coupled to said electrodes and to said pressure sensitive transducer to provide electric stimulation pulses to said electrodes, the intensity of said stimulation pulses being proportional to the pressure on said pressure sensitive transducer.

13. The combination according to claim 12 wherein said electronic circuit includes a self-contained power supply for providing said electric stimulation pulses to said electrodes in accordance with pressure exerted on said pressure sensitive transducer by said collar.

14. The combination according to claim 13 wherein said power supply comprises a battery.

15. The combination according to claim 14 wherein said housing is adapted for attachment to an animal collar at a position diametrically opposite to an attachment of a leash to such collar.

16. The combination according to claim 12 further including a second pair of electrodes extending from the rear face of said housing and coupled to said electronic circuit in said housing to receive electric stimulation pulses therefrom.

17. An animal training device including in combination:

a housing adapted for attachment to an animal collar at a position diametrically opposite an attachment of a leash to such collar, said housing having a rear face;

at least one pair of electrodes extending from the rear face of said housing;

a pressure sensitive transducer on said housing for responding to a pulling pressure on said animal collar; and an electronic circuit in said housing coupled to said electrodes and to said pressure sensitive transducer to provide electric stimulation pulses to said electrodes, the intensity of said stimulation pulses being proportional to the pressure on said pressure sensitive transducer.

* * * * *